(12) United States Patent
Onishi et al.

(10) Patent No.: US 11,506,385 B2
(45) Date of Patent: Nov. 22, 2022

(54) AIRCRAFT COMPONENT AND AIRCRAFT GAS-TURBINE ENGINE

(71) Applicant: MITSUBISHI HEAVY INDUSTRIES AERO ENGINES, LTD., Aichi (JP)

(72) Inventors: Tomoyuki Onishi, Tokyo (JP); Yasuyuki Uetsuki, Tokyo (JP); Tadayuki Hanada, Aichi (JP); Yohei Fujimoto, Aichi (JP); Takafumi Ota, Aichi (JP)

(73) Assignee: MITSUBISHI HEAVY INDUSTRIES AERO ENGINES, LTD., Aichi (JP)

( * ) Notice: Subject to any disclaimer, the term of this patent is extended or adjusted under 35 U.S.C. 154(b) by 322 days.

(21) Appl. No.: 16/074,430

(22) PCT Filed: May 17, 2016

(86) PCT No.: PCT/JP2016/064603
§ 371 (c)(1),
(2) Date: Aug. 1, 2018

(87) PCT Pub. No.: WO2017/134843
PCT Pub. Date: Aug. 10, 2017

(65) Prior Publication Data
US 2019/0032918 A1 Jan. 31, 2019

(30) Foreign Application Priority Data
Feb. 4, 2016 (JP) .............................. JP2016-019997

(51) Int. Cl.
*F23R 3/00* (2006.01)
*F23R 3/28* (2006.01)
(Continued)

(52) U.S. Cl.
CPC ................ *F23R 3/28* (2013.01); *B64D 27/10* (2013.01); *F23R 3/002* (2013.01); *F23R 3/283* (2013.01);
(Continued)

(58) Field of Classification Search
CPC ...... F01D 25/26; F01D 25/246; F01D 25/243; F01D 25/24; F23R 2900/00018;
(Continued)

(56) References Cited

U.S. PATENT DOCUMENTS 3,777,489 A  12/1973 Johnson et al.
4,870,826 A  10/1989 Daguet et al.
(Continued)

FOREIGN PATENT DOCUMENTS

JP  S6414519 A  1/1989
JP  2003232520 A  8/2003
(Continued)

OTHER PUBLICATIONS

International Search Report and Written Opinion for International Application No. PCT/JP2016/064603 dated Aug. 9, 2016; 15 pp.
(Continued)

*Primary Examiner* — Todd E Manahan
*Assistant Examiner* — Sean V Meiller
(74) *Attorney, Agent, or Firm* — Hauptman Ham, LLP

(57) ABSTRACT

An aircraft component is used for an aircraft gas-turbine engine. The aircraft component includes an annular part, a flange, and a boss. The annular part has an outer circumferential surface. The flange is formed at one end portion of the annular part in an axial direction. The boss projects from the outer circumferential surface of the annular part to the radial direction. On a section cut along an axial direction of the annular part, the outer circumferential surface of the annular part between the flange and the boss has a taper part (Continued)

that is formed into a tapered shape in which plate thickness becomes thicker from the flange toward the boss.

4 Claims, 4 Drawing Sheets

(51) Int. Cl.
    *F23R 3/42* (2006.01)
    *B64D 27/10* (2006.01)

(52) U.S. Cl.
    CPC ...... *F23R 3/42* (2013.01); *F23R 2900/00005* (2013.01)

(58) Field of Classification Search
    CPC .. F23R 2900/00017; F23R 2900/00005; F23R 3/60; F23R 3/28; F23R 3/002; F23R 3/00; F23R 3/283
    See application file for complete search history.

(56) References Cited

U.S. PATENT DOCUMENTS

| | | | |
|---|---|---|---|
| 6,314,739 B1 | 11/2001 | Howell et al. | |
| 6,681,577 B2* | 1/2004 | Bolender | F23R 3/002 |
| | | | 60/754 |
| 7,565,796 B2* | 7/2009 | Eleftheriou | F01D 25/162 |
| | | | 415/9 |
| 9,316,108 B2* | 4/2016 | Pegan, Jr. | F01D 25/162 |
| 9,828,880 B2* | 11/2017 | Ballard, Jr. | F01D 11/24 |
| 2008/0112797 A1 | 5/2008 | Seitzer et al. | |
| 2013/0174561 A1 | 7/2013 | Stoia et al. | |
| 2013/0227930 A1 | 9/2013 | Pegan, Jr. et al. | |
| 2015/0240662 A1* | 8/2015 | Niggemeier | F01D 25/24 |
| | | | 415/207 |
| 2016/0146052 A1* | 5/2016 | McGinnis | F01D 21/045 |
| | | | 415/200 |
| 2019/0032918 A1* | 1/2019 | Onishi | F23R 3/28 |

FOREIGN PATENT DOCUMENTS

| | | |
|---|---|---|
| JP | 2008031871 A | 2/2008 |
| JP | 2008121685 A | 5/2008 |
| JP | 2013142533 A | 7/2013 |
| JP | 2013185588 A | 9/2013 |

OTHER PUBLICATIONS

Extended European Search Report for European Application No. 16889327.9 dated Oct. 22, 2018; 10pp.

* cited by examiner

AIRCRAFT COMPONENT AND AIRCRAFT GAS-TURBINE ENGINE

RELATED APPLICATIONS

The present application is a National Phase of International Application No. PCT/JP2016/064603 filed May 17, 2016 and claims priority based on Japanese based Application No. 2016-019997 filed Feb. 4, 2016.

FIELD

The present invention relates to an annular aircraft component including a flange and a boss and to an aircraft gas-turbine engine.

BACKGROUND

Conventionally, there is a combustion case for a gas-turbine engine as an aircraft component (for example, refer to Patent Literature 1). In this combustion case, an aperture is formed, and a boss is formed to enhance the strength of the aperture. Forming a T-shaped slot in this boss can provide a stress reduction measure such as a measure for relaxing stress that is generated in the boss.

CITATION LIST

Patent Literature

Patent Literature 1: Japanese Patent Application Laid-open No. 2003-232520

SUMMARY

Technical Problem

In an aircraft component disclosed in Patent Literature 1, when a T-shaped slot is formed, a band is formed in the circumferential direction. Forming a band means making a major design change.

It is an object of the present invention to provide an aircraft component and an aircraft gas-turbine engine capable of reducing stress and extending product life.

Solution to Problem

According to the present invention, an aircraft component used for an aircraft gas-turbine engine includes: an annular part having an outer circumferential surface; a flange that is formed at one end portion of the annular part in an axial direction; and a boss that projects from the outer circumferential surface of the annular part to the radial direction. On a section cut along an axial direction of the annular part, the outer circumferential surface of the annular part between the flange and the boss has a taper part that is formed into a tapered shape in which plate thickness becomes thicker from the flange toward the boss.

This configuration, which includes a taper part, can moderate a change in plate thickness from the flange toward the boss and can moderate a temperature gradient. In addition, this configuration can moderate a change in rigidity of plate thickness from the flange toward the boss. Thus, stress generated around the boss can be reduced and product life can be extended.

Preferably, when a distance between the flange and the boss in the axial direction of the annular part is defined as d and a length of the taper part in the axial direction of the annular part is defined as d', the length d' of the taper part is in a range of $0.5d \leq d' \leq d$.

This configuration enables a length of the taper part to be made suitable, thereby suitably reducing stress.

Preferably, when a distance between the flange and the boss the axial direction of the annular part is defined as d, an inclination angle of the taper part with respect to the axial direction of the annular part is defined as $\theta$, plate thickness of a thinnest portion that is thinnest in the annular part is defined as t, and plate thickness of the boss is defined as h, the inclination angle $\theta$ is in a range of $0.3(h-t)/d \leq \theta \leq (h-t)/d$.

This configuration enables an inclination angle of the taper part to be made suitable, thereby suitably reducing stress.

Preferably, the flange is formed to extend in a circumferential direction of the annular part, and the boss has a portion facing the flange and formed parallel to the flange.

This configuration increases an area of the taper part formed between the flange and the boss, thereby suitably reducing stress.

Preferably, when a width of a portion of the boss parallel to the flange is defined as a and a curvature radius of a circumferential edge of the boss centering a bolt-hole that is formed by penetrating the boss is defined as b, the width a of the portion of the boss is in a range of $b < a < 3b$.

This configuration enables a width of the boss to be made suitable, thereby suitably reducing stress.

According to the present invention, an aircraft gas-turbine engine includes the aircraft component.

This configuration enables the aircraft component suitably reducing stress to be employed, thereby enhancing reliability of the aircraft gas-turbine engine.

DESCRIPTION OF EMBODIMENT

An embodiment according to the present invention will now be described in detail with reference to the accompanying drawings. It should be noted that the embodiment is not intended to limit the present invention. Components in the embodiment include components that can be replaced and are facilitated by the skilled person or substantially like components. In addition, components described below can be combined as appropriate. Furthermore, when there are a plurality of embodiments, each of the embodiments can be combined.

EMBODIMENT

Figure 1:
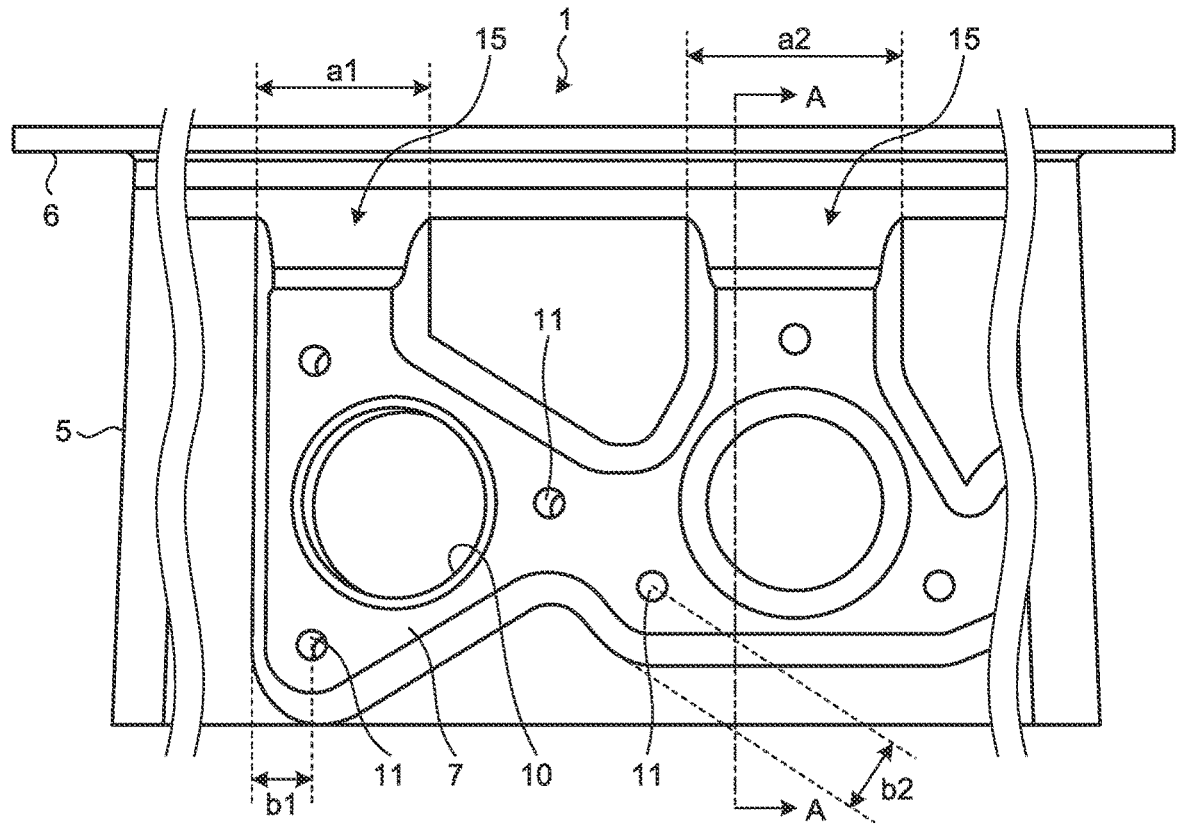
FIG. 1 is a view illustrating an aircraft component according to an embodiment.
Figure 2:
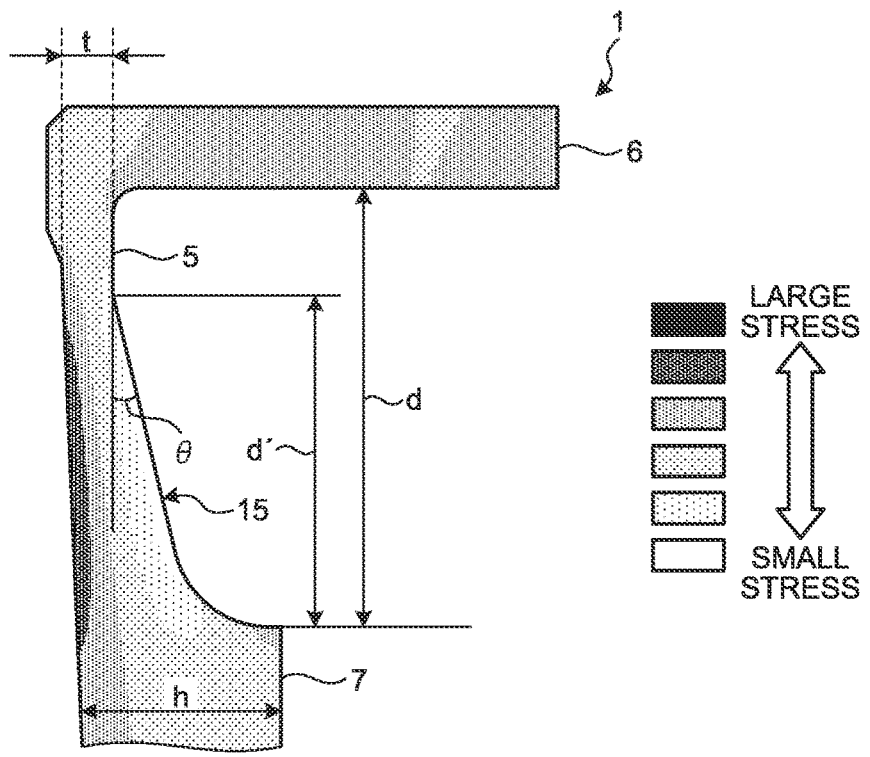
FIG. 2 is a sectional view when the aircraft component according to the embodiment is cut along an axial direction.
Figure 3A:
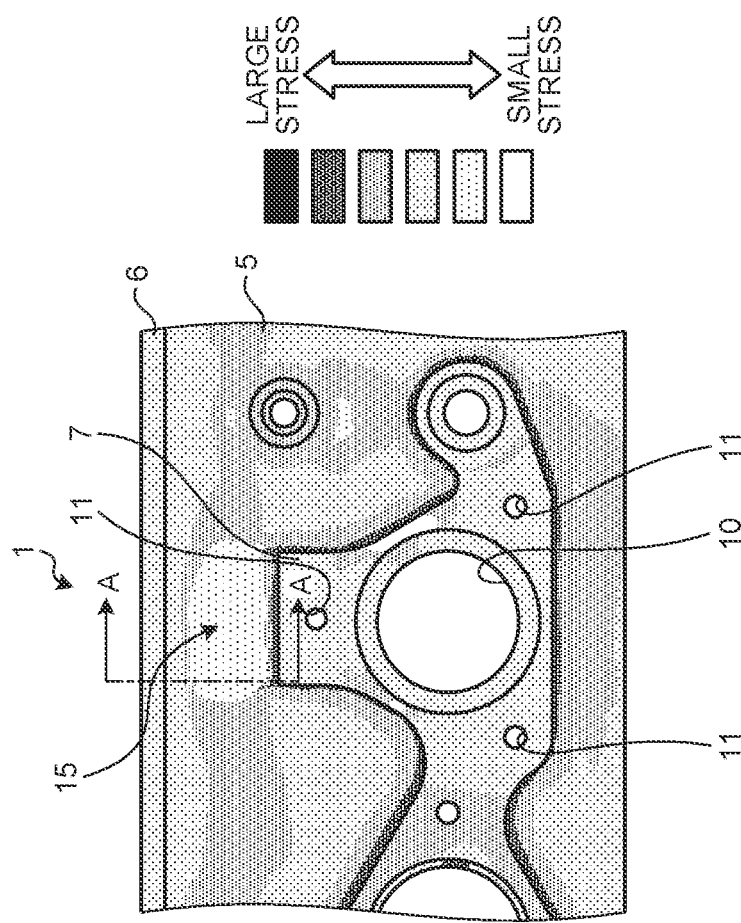
FIGS. 3A-3B are explanatory drawings illustrating an example of comparing thermal stress of the aircraft component according to the embodiment with thermal stress of a conventional aircraft component.
Figure 3B:
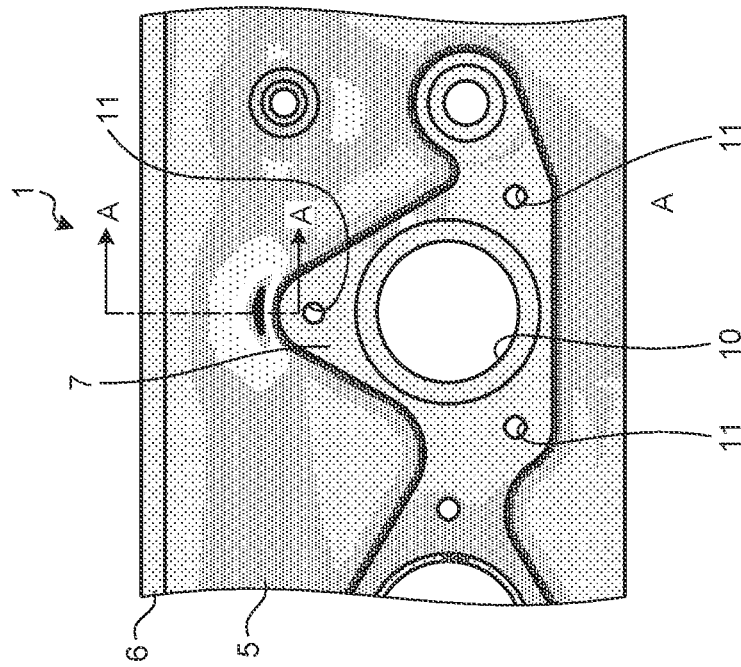
Figure 4A:
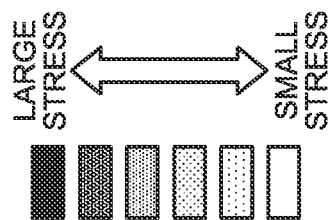
FIGS. 4A-4B are explanatory drawings illustrating an example of comparing thermal stress of the aircraft component according to the embodiment with thermal stress of the conventional aircraft component.
Figure 4B:
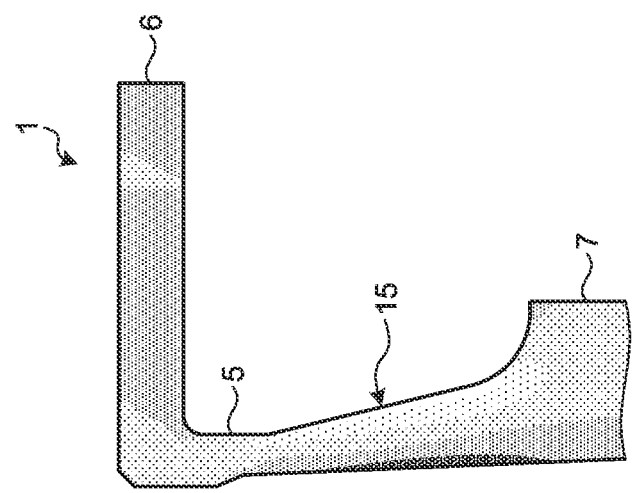
Figure 5:
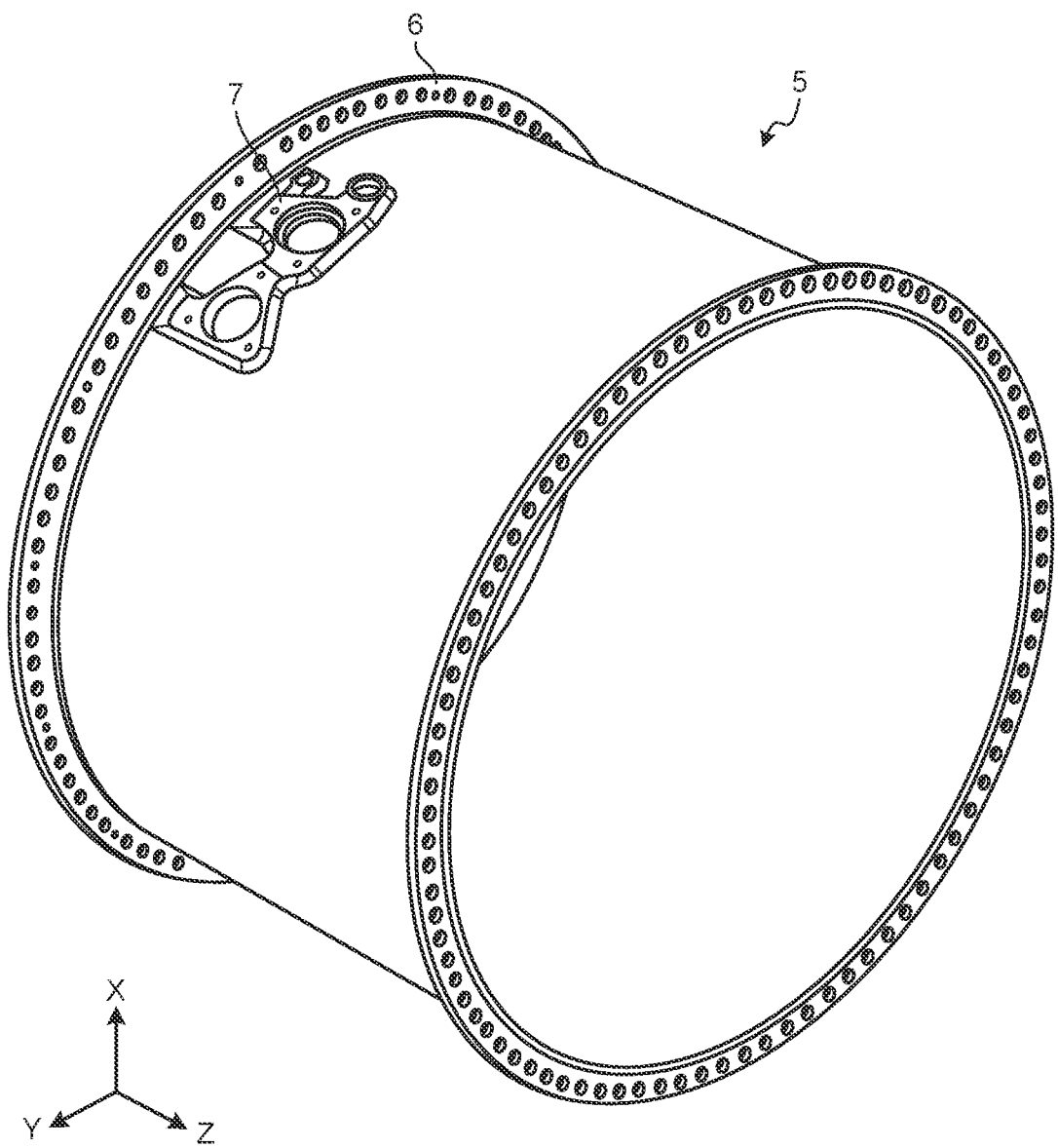
FIG. 5 is a perspective view of the aircraft component according to the embodiment.

An aircraft component according to the embodiment is used for an aircraft gas-turbine engine, and is, for example, a component forming a casing of a combustor. FIG. 1 is a view illustrating an aircraft component according to the embodiment. FIG. 2 is a sectional view when the aircraft component according to the embodiment is cut along an axial direction. FIGS. 3A-3B and 4A-4B are explanatory drawings illustrating an example of comparing thermal stress of the aircraft component according to the embodiment with thermal stress of a conventional aircraft component. FIG. 5 is a perspective view of the aircraft component according to the embodiment. The following describes a case when the embodiment is applied as an aircraft component to a casing of a combustor, but this is not especially limiting. The embodiment may be applied to any aircraft component.

An aircraft component includes an annular part 5, a flange 6, and a boss 7. The annular part 5 is formed in an annular shape in the circumferential direction when setting a predetermined direction as an axial direction, and the boss 7 is formed on an outer circumferential surface of the annular part 5. The flange 6 is provided to one end portion of the annular part 5, projects to the outside in the radial direction, and is provided over the whole circumference to extend in the circumferential direction. The boss 7 is formed to project from an outer circumferential surface of the annular part 5 to the outside in the radial direction.

The boss 7 has circular through-holes 10 formed therein for communicating with the inside and the outside. To the through-holes 10, fuel piping not illustrated for supplying fuel is connected. The boss 7 has a plurality of bolt-holes 11 formed therein around the through-holes 10 for fastening the fuel piping to the aircraft component 1.

The boss 7 is formed to have a thickness thicker than a thinnest portion of the annular part 5. In the boss 7, portions facing the flange 6 are formed parallel to the flange 6. In other words, circumferential edge portions of the boss 7 facing the flange 6 are each formed in a linear shape so as to be parallel to the flange 6.

A width of a portion of the boss 7 facing the flange 6, in other words, a width of a portion of the boss 7 in the circumferential direction is defined as a. A curvature radius of the circumferential edge of the boss 7 centering the bolt-hole 11 that is formed by penetrating the boss 7 is defined as b. Specifically, a width of a portion of the boss 7 on the left side in FIG. 1 is defined as a1, and a curvature radius of the circumferential edge of the boss 7 on the left side in FIG. 1 is defined as b1. A width of a portion of the boss 7 on the right side in FIG. 1 is defined as a2, and a curvature radius of the circumferential edge of the boss 7 on the right side in FIG. 1 is defined as b2. In this case, the widths a1 and a2 of the boss 7 are in the range of b1<a1<3b1 and of b2<a2<3b2, respectively.

As illustrated in FIG. 2, the aircraft component 1 has, on a section (section along A-A in FIG. 1) cut along an axial direction of the annular part 5, a taper part 15 between the flange 6 and the boss 7. In the taper part 15, a shape of an outer circumferential surface of the annular part 5 between the flange 6 and the boss 7 is formed into a tapered shape in which plate thickness becomes thicker from the flange 6 toward the boss 7. A surface that becomes a tapered shape is linearly formed on a section cut along an axial direction of the annular part 5.

A distance between the flange 6 and the boss 7 in an axial direction of the annular part 5 is defined as d. A length of the taper part 15 in an axial direction of the annular part 5 is defined as d'. In this case, the length d' of the taper part 15 is in the range of $0.5d \leq d' \leq d$.

An inclination angle θ of the taper part 15 with respect to an axial direction of the annular part 5 is in the following range. Plate thickness of the thinnest portion that is thinnest in the annular part 5 is defined as t, and plate thickness of the boss 7 is defined as h. In this case, the inclination angle θ is in the range of $0.3(h-t)/d \leq \theta \leq (h-t)/d$.

Figure 4A:
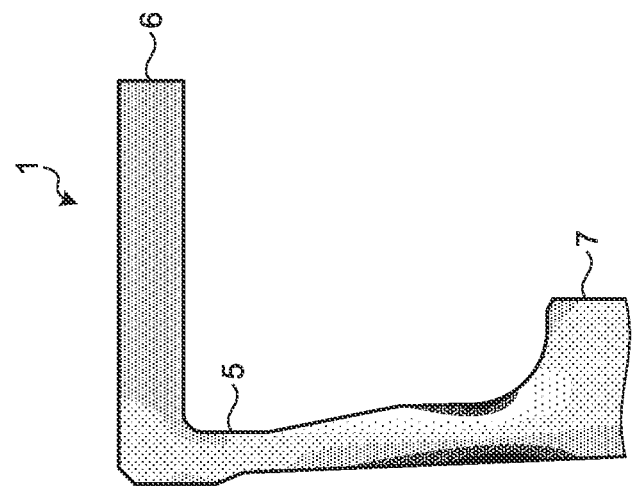

With reference to FIGS. 3 and 4, stress distribution of a conventional aircraft component 1 is compared with stress distribution of the aircraft component 1 according to the embodiment. Stress indicates thermal stress generated by difference in temperature between the inside and the outside of the annular part 5. The conventional aircraft component 1 is not provided with the taper part 15, and the shape of a portion of the boss 7 facing the flange 6 is a mountainous shape projecting toward the flange 6 side.

As illustrated in FIG. 3A, in the conventional aircraft component 1, stress is larger at the annular part 7 between the flange 6 and the boss 7, especially on a base side of the boss 7. By contrast, as illustrated in FIG. 3B, in the aircraft component 1 according to the embodiment, it has been confirmed that stress is relaxed at the taper part 15 between the flange 6 and the boss 7. As illustrated in FIG. 4A (section along AA in FIG. 3A), in the conventional aircraft component 1, stress on front and rear sides of the annular part 5 is larger at the annular part 5 between the flange 6 and the boss 7, especially on a base side of the boss 7. By contrast, as illustrated in FIG. 4B, in the aircraft component 1 according to the embodiment, it has been confirmed that stress on front and rear sides of the taper part 15 is relaxed at the taper part 15 between the flange 6 and the boss 7.

As described above, according to the embodiment, the taper part 15 is provide between the flange 6 and the boss 7. This configuration can moderate a change in plate thickness from the flange 6 toward the boss 7, and can moderate a temperature gradient. In addition, this configuration can moderate a change in rigidity of plate thickness from the flange 6 toward the boss 7. Thus, stress generated around the boss 7 can be reduced and product life can be extended.

According to the embodiment, the length d' of the taper part 15, the inclination angle θ of the taper part 15, and the widths a1 and a2 of the boss 7 can be set in a suitable range, thereby suitably reducing stress.

According to the embodiment, a portion of the boss 7 facing the flange 6 is formed parallel to the flange 6. This increases an area of the taper part 15 formed between the flange 6 and the boss 7, thereby suitably reducing stress.

According to the embodiment, the aircraft component 1 suitably reducing stress can be applied to an aircraft gas-turbine engine, thereby improving reliability of the aircraft gas-turbine engine.

REFERENCE SIGNS LIST

1 AIRCRAFT COMPONENT
5 ANNULAR PART
6 FLANGE
7 BOSS
10 THROUGH-HOLE
11 BOLT-HOLE

The invention claimed is:
1. An aircraft component used for an aircraft gas-turbine engine, the aircraft component comprising:
   an annular part having an outer circumferential surface;
   a flange that is formed at one end portion of the annular part in an axial direction; and
   a boss that projects from the outer circumferential surface of the annular part to a radial direction, wherein on a section cut along an axial direction of the annular part, the annular part between the flange and the boss has
a first part having a flat surface, and
a second part having an inclination with respect to the first part to define an inclination angle, extending from the first part to the boss, and having a plate thickness continuously increasing toward the boss, wherein the inclination angle does not decrease along an entirety of the second part from the first part to the boss, and
when a distance between the flange and the boss in the axial direction of the annular part is defined as d and a length of the second part in the axial direction of the annular part is defined as d', the length d' of the second part is in a range of $0.5d \leq d' \leq d$.

2. The aircraft component according to claim 1, wherein the flange is formed to extend in a circumferential direction of the annular part, and
the boss has a portion facing the flange and formed parallel to the flange.

3. The aircraft component according to claim 2, wherein when a width of the portion of the boss parallel to the flange is defined as a, and a curvature radius of a circumferential edge of the boss centering a bolt-hole that is formed by penetrating the boss is defined as b, the width a is in a range of $b < a < 3b$.

4. An aircraft gas-turbine engine comprising the aircraft component according to claim 1.

* * * * *